UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

ORGANIC ACID OF THE DIPHENYL-METHANE SERIES AND A PROCESS OF PREPARING THE SAME

No Drawing. Application filed July 2, 1928. Serial No. 290,028.

This invention relates to 3'-amino-4'-hydroxy (alkoxy) benzyl ortho benzoic acids, the readily hydrolyzable nitrogen substitution products thereof, as for example the acidyls and the urea derivatives, and to the process of preparing the same.

It is an object of this invention to provide a method whereby these products may be made technically available as they are valuable products in themselves and more particularly so when used as the starting material for the preparation of dyestuffs.

Other and further important objects of this invention will become apparent from the following description and appended claims.

In a copending application executed of even date herewith, there is described a method for the preparation of 2'- and 3'-aminobenzyl ortho benzoic acids. We have now found that the 3'-amino-4'-hydroxy (or alkoxy)-benzyl ortho benzoic acids may be prepared in a similar manner and on account of their chemical structure are well adapted for the preparation of other products and, in particular, dyestuffs. These new products are prepared from the corresponding amino benzoyl benzoic acids by reducing the latter according to known methods adapted for the reduction of other benzoyl benzoic acids as for example, with aqueous ammonia and zinc dust. The reaction is probably best expressed by the following chemical equation:

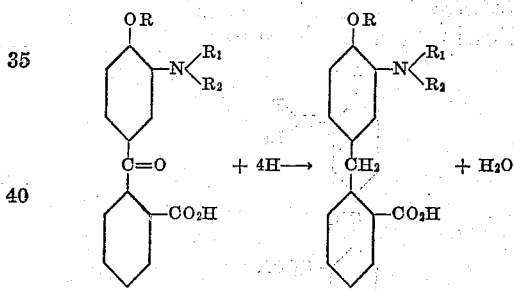

in which R represents a hydrogen or an alkyl group such as methyl, ethyl and the like, and $R_1$ and $R_2$ are H atoms or readily hydrolizable substituents such as acidyl groups, benzylidene and the like.

The acidyl derivatives may be prepared either directly from the amino benzyl benzoic acid derivatives by methods adapted to prepare similar derivatives of aniline homologues or the acidyl derivative of the amino benzoyl benzoic acid derivative may be reduced with zinc as in the case of the unsubstituted nitrogen amino body and isolated directly as the acidyl amino benzyl benzoic acid.

Such derivatives as urea, benzylidene and the like, may be prepared from the amino benzyl ortho benzoic acids by known methods adapted to prepare these derivatives from other amines.

3'-amino-4'-hydroxy (alkoxy) benzyl ortho benzoic acids are, in general, white or cream colored solids depending upon their purity. When pure, they are practically white. They are soluble in dilute caustic soda, sodium carbonate, ammonia and the like, but are practically insoluble in water. The addition of acids such as hydrochloric, sulfuric and the like to a water suspension transforms them into the corresponding salts, which at first dissolve to some extent, especially in a heated solution and may then be precipitated by adding more acid and cooling. As thus obtained the products are in the form of their hydrochlorides or sulfates, respectively. Upon treatment with concentrated sulfuric acid at an elevated temperature, 3'-amino-4'-methoxy benzyl ortho benzoic acid at first dissolves with a yellow color and then becomes greenish and the solution will be found to contain the amino-anthrone. This upon suitable treatment with oxidizing agents is transformed into the amino methoxy anthraquinone.

The acidyl derivatives are in general white crystalline substances. Concentrated sulfuric acid reacts upon them at an elevated temperature in a similar manner to that described in connection with the amines. The anthrones can be oxidized by suitable oxidizing agents to the corresponding anthraquinone derivatives. The acidyl derivatives of amino benzyl ortho benzoic acid may be saponified to the mother substances, namely the amino benzyl benzoic acids.

Without limiting our invention to any particular procedure, the following examples in which parts by weight are given, will serve to illustrate our method in its preferred form.

*Example 1*

A mixture containing 2000 parts of water, 1600 parts of concentrated ammonia, 50 parts of copper sulfate (crystals), 271 parts of 3'-amino-4'-methoxy ortho benzoyl benzoic acid and 500 parts of zinc dust is heated to 70 to 80° C. This temperature is maintained with agitation for about fifteen hours. The zinc residues are then filtered from the reaction mass and to the filtrate are added about 200 parts of sodium carbonate. The ammonia is now distilled off and the residual liquor again filtered to remove further insoluble residues. The filtrate is charged into a small amount of ice to which about 100 parts of acetic acid have been added. The product separates and is filtered off. After a recrystallization from benzene, the product, 3'-amino-4'-methoxy benzyl ortho benzoic acid, melts at 148–149° C.

3'-amino-4'-ethoxy benzyl ortho benzoic acid may be prepared in a similar manner. 3'-amino-4'-ethoxy benzyl ortho benzoic acid melts at 137 to 138° C.

*Example 2*

A mixture containing 257 parts of 3'-amino-4'-hydroxy ortho benzoyl benzoic acid, 1300 parts of ammonia (27%), 1800 parts of water and 60 parts of copper sulfate crystals, 500 parts of zinc dust is agitated at 70 to 80° C. for 14 to 16 hours. The zinc residues are filtered and to the filtrate are added 200 parts of sodium carbonate. The ammonia is now distilled off. The residual liquor is then filtered from further residues and the filtrate run into diluted sulfuric acid. The acidity of this solution is then adjusted by the further addition of sulfuric acid, if necessary, to a point where it shows a strong acidity on Congo red paper. The sulfate of 3'-amino-4'-hydroxy benzyl ortho benzoic acid separates. This crude product is filtered off and may be purified by dissolving it in hot 2% sulfuric acid and filtering hot from a small amount of dark colored impurities with the aid of some filtercell. On cooling, the neutral sulfate of 3'-amino-4'-hydroxy benzyl ortho benzoic acid crystallizes out in small white needles forming star shaped aggregates.

By way of illustration the following example is given for the preparation of 3'-acetyl amino-4'-methoxy benzyl benzoic acid:

3'-amino-4'-methoxy benzyl ortho benzoic acid is dissolved in glacial acetic acid and heated up after the addition of a small amount of acetic anhydride. Upon cooling and diluting with water, the acetyl derivative is obtained in the form of white crystals. Upon recrystallizing the crude body from diluted acetic acid, the 3'-acetyl amino-4'-methoxy benzyl ortho benzoic acid melts at 155° C.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing compounds of the general formula:

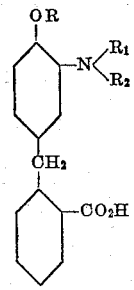

in which R represents a hydrogen or an alkyl group, and $R_1$ and $R_2$ are H-atoms or readily hydrolyzable substituents which comprises reducing the corresponding benzoyl compounds.

2. The process of preparing compounds of the general formula:

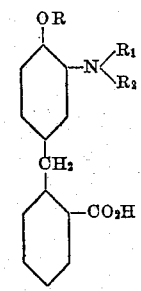

in which R represents a hydrogen or an alkyl group, and $R_1$ and $R_2$ are H-atoms or readily hydrolyzable substituents which comprises reducing the corresponding benzoyl compounds with zinc in an ammoniacal solution in the presence of copper salts.

3. As new articles of manufacture, 3'-amino-4'-oxy benzyl ortho benzoic acids of the following general formula:

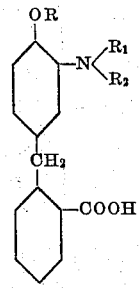

in which R is an H-atom or an alkyl group, and $R_1$ and $R_2$ are H-atoms or readily hydrolyzable substituents.

4. As a new article of manufacture, 3'-amino-4'-methoxy-benzyl-ortho-benzoic acid.

5. As new articles of manufacture, compounds having the following probable general formula:

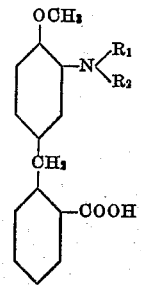

in which $R_1$ and $R_2$ are H atoms or acidyl groups.

6. The process of preparing a 3'-amino-4'-alkoxy-benzyl-ortho-benzoic acid which is a member of the group consisting of the primary 3'-amino-4'-alkoxy-benzyl-ortho-benzoic acids and those N-substitution derivatives thereof which contain a readily hydrolyzable substituent in the N-atom, which comprises reducing the corresponding 3'-amino-4'-alkoxy-benzoyl-ortho-benzoic acid.

7. The process of preparing a 3'-amino-4'-alkoxy-benzyl-ortho-benzoic acid which is a member of the group consisting of the primary 3'-amino-4'-alkoxy-benzyl-ortho-benzoic acids and those N-substitution derivatives thereof which contain a readily hydrolyzable substituent in the N-atom, which comprises reducing the corresponding 3'-amino-4'-alkoxy-benzoyl-ortho-benzoic acid with zinc in ammoniacal solution in the presence of copper sulfate.

8. As new articles of manufacture, 3'-amino-4'-alkoxy-benzyl-ortho-benzoic acids which are members of the group consisting of the primary 3'-amino-4'-alkoxy-benzyl-ortho-benzoic acids and those N-substitution derivatives thereof which contain a readily hydrolyzable substituent in the N-atom.

9. A process of preparing a 3'-amino-4'-alkoxy-benzyl-ortho-benzoic acid which is a member of the group consisting of the primary 3'-amino-4'-alkoxy-benzyl-ortho-benzoic acids and those N-substitution derivatives thereof which contain a readily hydrolyzable substituent in the N-atom, which comprises reducing the corresponding 3'-amino-4'-alkoxy-benzoyl-ortho-benzoic acids with zinc in an alkaline solution in the presence of a copper salt and at a temperature of 70 to 80° C.

In testimony whereof we have hereunto subscribed our names at Carrollville, Milwaukee County, Wis.

IVAN GUBELMANN.
HENRY J. WEILAND.
OTTO STALLMANN.